Figure 1:
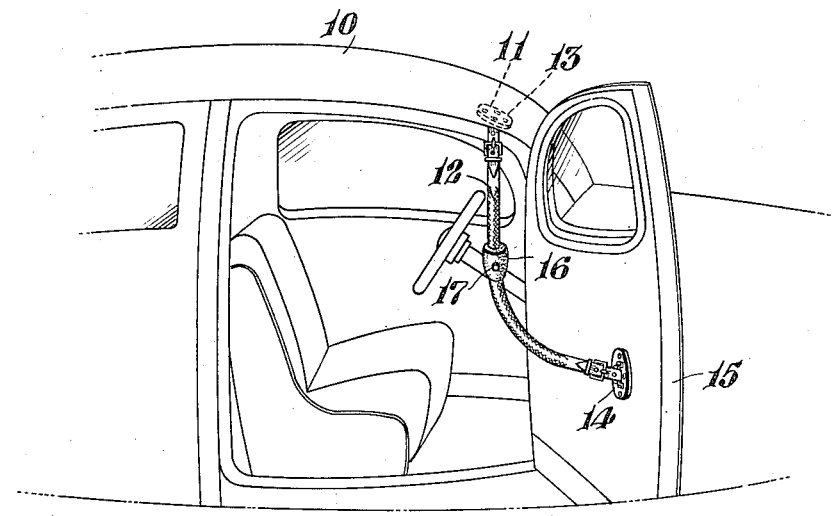

Sept. 20, 1938. G. J. BASEL 2,130,410

FLEXIBLE DOOR PULL AND HAND ASSIST FOR AN AUTOMOBILE

Original Filed Sept. 23, 1936

Inventor:
George Joseph Basel by Lawler & Lawler
Attorneys.

Patented Sept. 20, 1938

2,130,410

UNITED STATES PATENT OFFICE 2,130,410

FLEXIBLE DOOR PULL AND HAND ASSIST FOR AN AUTOMOBILE

George Joseph Basel, Cleveland, Ohio

Original application September 23, 1936, Serial No. 102,148. Divided and this application October 30, 1937, Serial No. 171,942

1 Claim. (Cl. 268—3)

This invention relates broadly to a flexible pull device by means of which an automobile door may be closed from the driver's position behind the steering wheel without leaving his position.

This application is a division of my copending application Serial Number 102,148 filed September 23rd, 1936.

One of the most important objects of the present invention is to provide a compact pull of the character described which is simple in design and capable of easy operation.

The invention and its aims and objects will be clearly understood from the following description and the illustrative forms of apparatus for carrying out the same and illustrated in the accompanying drawing, the true scope of the invention being more particularly pointed out in the appended claim.

Several reference numerals indicate the same part throughout the several views of the drawing.

Fig. 1 is an explanatory view, illustrating an embodiment of my invention installed in an automobile body. The automobile body is shown fragmentary with its front door open. The pull is shown with its attachments and the hand assist thereon.

In Fig. 1, 10 is an automobile body, 11 a fastening plate, in or to which the upper end of the pull 12 is secured in any suitable practical manner. Obviously a bracket may be used instead of the plate if found desirable. The plate is secured to the interior of the car or automobile body, forwardly and upwardly of the front seat as at 13, and to the right of the driver, if the automobile be a left hand drive. The lower end of the pull is likewise provided with a fastening plate 14, fastened to the automobile door 15.

The pull is provided with a means 16 of egg or other suitable geometric shape made of hard rubber or other suitable material, adapted to prevent the hand slipping down on the pull, when the pull is used as a hand assist. The means 16 may be moved up or down on the pull by releasing and resetting the screw or other suitable securing means 17 in the means 16. The securing means may be flush with or extend out from the contour of the means.

The pull may be an integral structure as shown in Fig. 1, or a combination of concatenated components.

The pull is flexible, the flexibility is necessary to compensate for want of alignment between the fastening plates and also to permit movement of the pull to position itself when the automobile door is open, and likewise when it is closed. The pull may be composite, made of leather, suitable fabric, rope or the like if desired.

The pull with its hand assist thereon is practically free from pendulating motion, when not being used, because the motion of the weight of the hand assist on the pull is stifled or practically neutralized because of the arrangement and location of the attaching plate.

Figure 2:
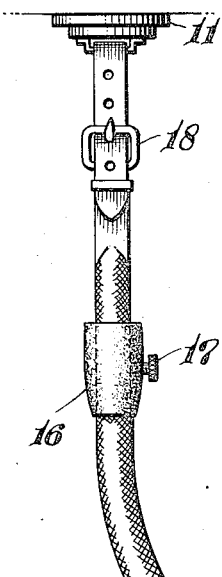

The pull may be provided with length adjusting means at one or both its ends such as buckles shown in Fig. 2, at 18.

It is believed that the operation of the device as a whole will be clear, in view of the following description which has been given in connection with the construction of the same.

Other applications and other modifications are contemplated within the scope of the present invention, as will be apparent to those skilled in the art. It is therefore to be understood that the embodiments herein disclosed are to be regarded as illustrative of the invention, and not restrictive, and the appended claim is to be construed broadly except as limitations may be necessary in view of the prior art.

What I claim as new and desire to secure by Letters Patent of the United States, is:—

In an apparatus of the class described, the combination with an automobile door, of an integral flexible door pull member consisting of an upper portion, an intermediate portion, and an adjusting portion of elongated loop configuration having a free end defined by training a portion of the adjusting portion back upon the intermediate portion, a buckle fixed to the intermediate portion, a hand assist of ovate configuration adjustably mounted on the door pull member, a set screw, the set screw in the hand assist and adapted to maintain the hand assist in predetermined position on the door pull member, an upper supporting and retaining member for the end of the upper portion, disposed laterally and forwardly of a steering wheel, and inwardly of a supporting member on which the door is hingedly connected, and adjacent the underside of a roof structure, a lower supporting and retaining member fixed to the inner side of the automobile door, the elongated loop being trained in the aforesaid supporting and retaining member and the free end of the loop secured in the buckle to maintain adjustment after being made.

GEORGE JOSEPH BASEL.